(12) United States Patent
Motoi et al.

(10) Patent No.: US 7,236,261 B2
(45) Date of Patent: Jun. 26, 2007

(54) IMAGE FORMING APPARATUS AND SCANNING METHOD

(75) Inventors: Toshihiro Motoi, Hachioji (JP); Toshihiko Nakazawa, Hachioji (JP)

(73) Assignee: Konica Corporation, Tokyo (JP)

(*) Notice: Subject to any disclaimer, the term of this patent is extended or adjusted under 35 U.S.C. 154(b) by 989 days.

(21) Appl. No.: 10/410,422

(22) Filed: Apr. 9, 2003

(65) Prior Publication Data
US 2003/0202221 A1 Oct. 30, 2003

(30) Foreign Application Priority Data
Apr. 26, 2002 (JP) ............................. 2002-126202

(51) Int. Cl.
G06F 15/00 (2006.01)
G06K 1/00 (2006.01)

(52) U.S. Cl. ........................................ 358/1.4; 347/235

(58) Field of Classification Search ................. 358/1.1, 358/1.9, 1.11–1.18; 347/235, 234, 248, 250
See application file for complete search history.

(56) References Cited

U.S. PATENT DOCUMENTS 6,236,415 B1 * 5/2001 Nozaki et al. .............. 347/116

FOREIGN PATENT DOCUMENTS

JP 7-160084 A 6/1995

* cited by examiner

*Primary Examiner*—Gabriel Garcia
*Assistant Examiner*—Thierry L. Pham
(74) *Attorney, Agent, or Firm*—Frishauf, Holtz, Goodman & Chick, PC

(57) ABSTRACT

An image forming apparatus having: a plurality of scanners, each of the scanners having a rotary polygonal mirror; a position detecting section for generating an image start reference signal in a main scanning direction; a PLL control section for controlling a rotation number of the mirror on a basis of a reference frequency signal of the mirror and a pulse signal generated per one rotation of the mirror; and a phase control section for detecting phase difference of each mirror on the basis of the image start reference signal in the main scanning direction in the plurality of the scanners, controlling a phase of the reference frequency signal of each mirror, and correcting image deviation in a sub-scanning direction of an image formed by the plurality of the scanners. A control angle in which one rotation angle of the mirror is divided by a number of the pulse signal generated per one rotation of the mirror is equal to an integral multiple of a division angle in which one rotation angle of the mirror is divided by a number of mirror faces of the mirror.

20 Claims, 7 Drawing Sheets

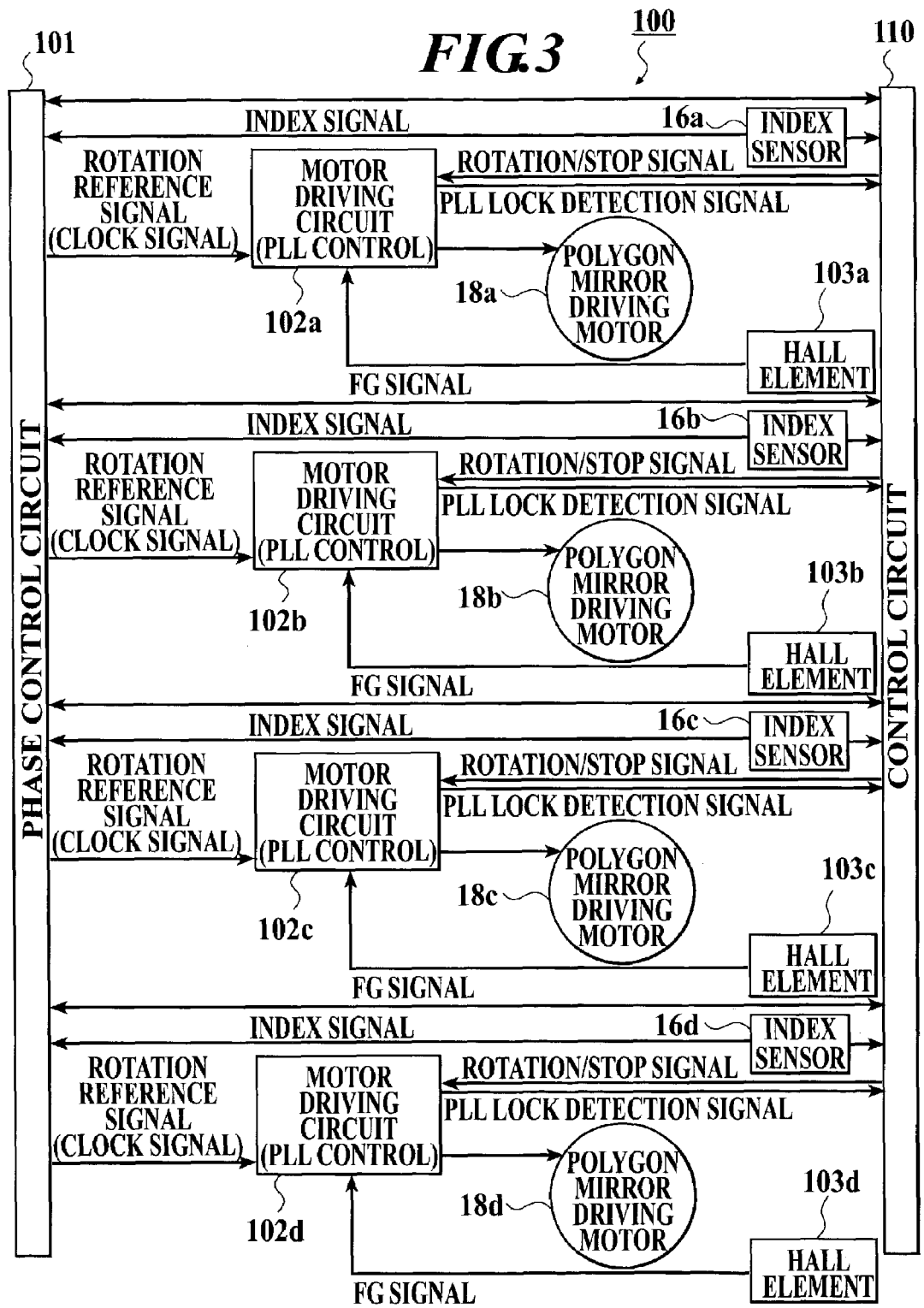

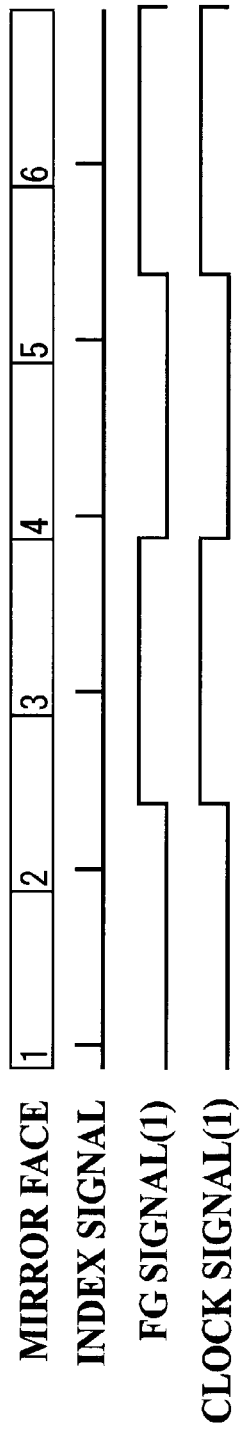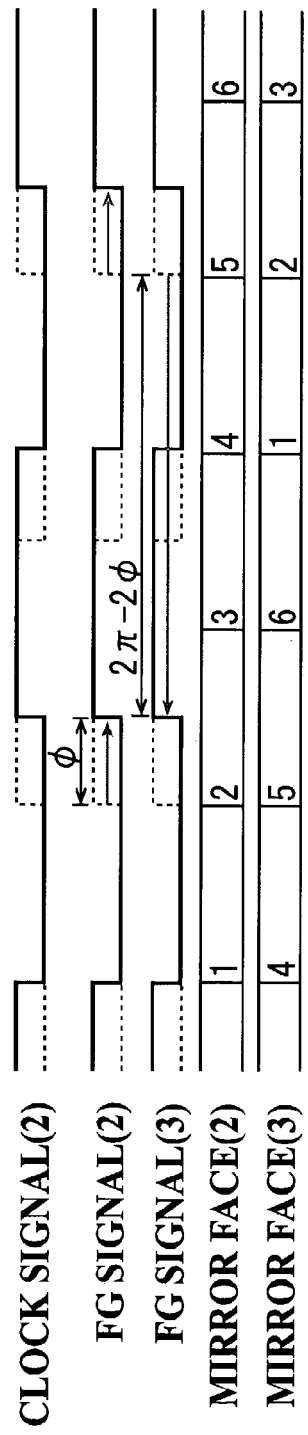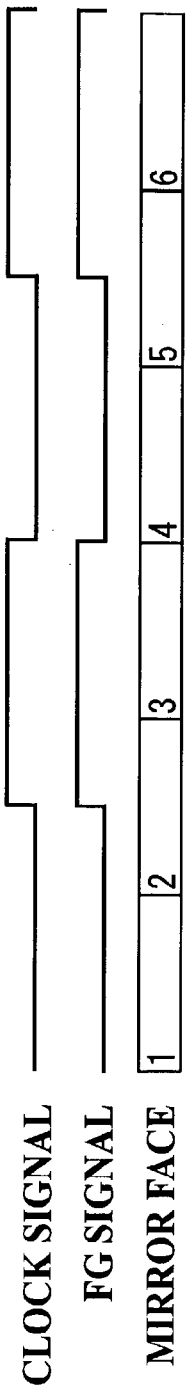

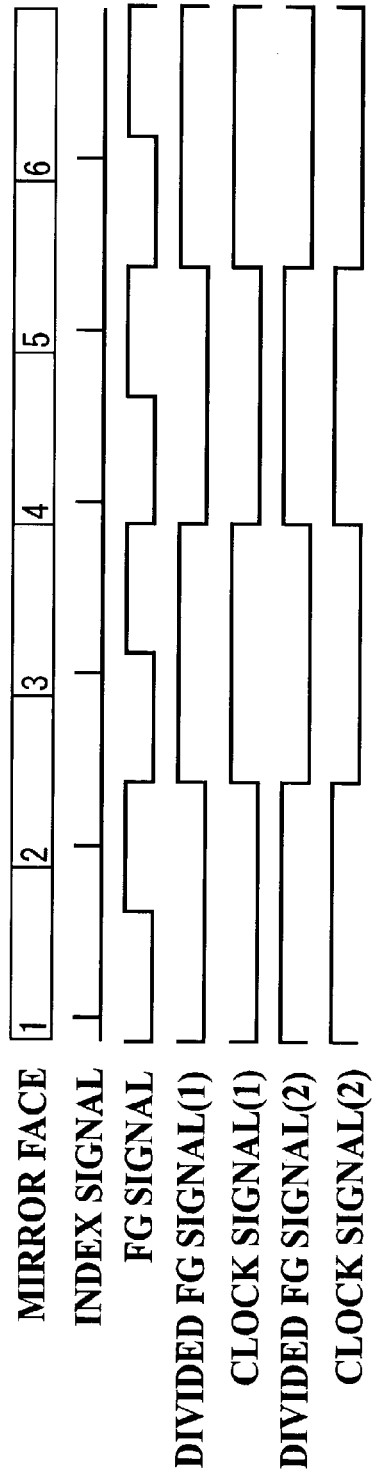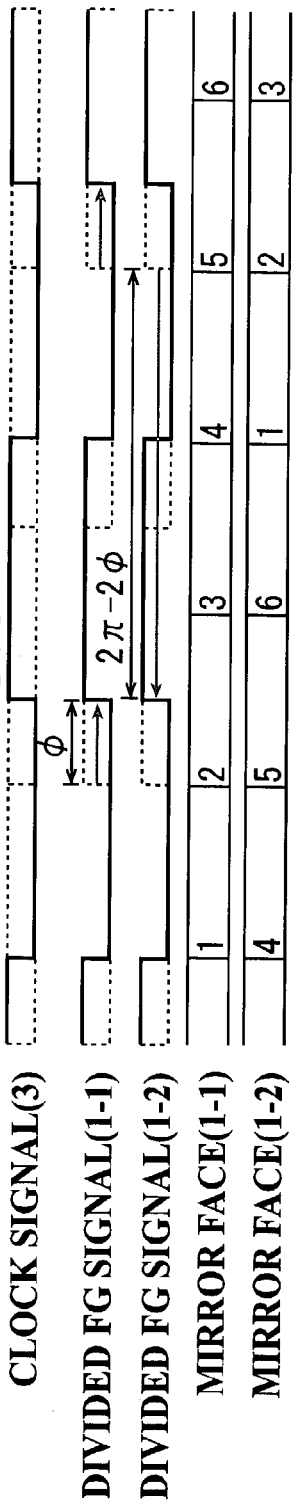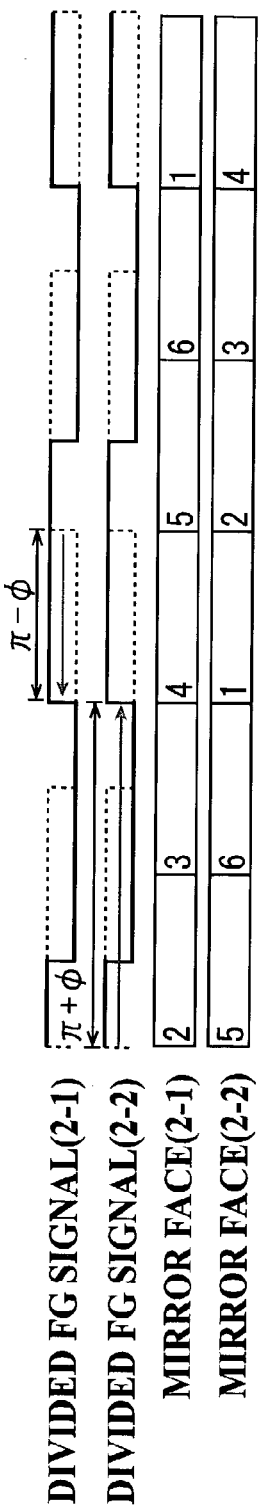

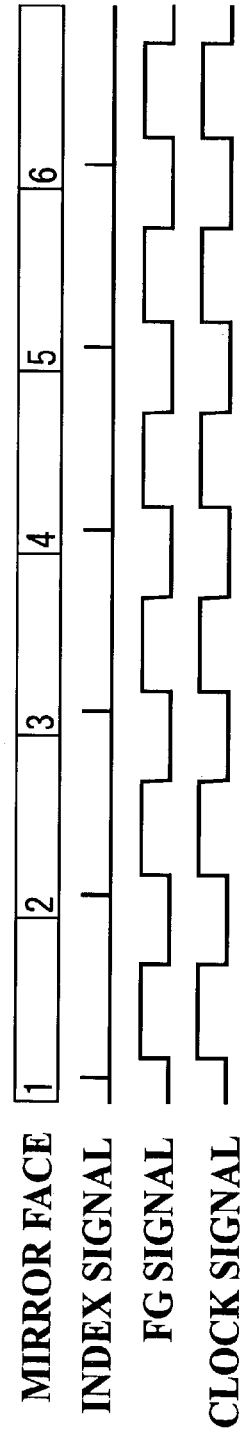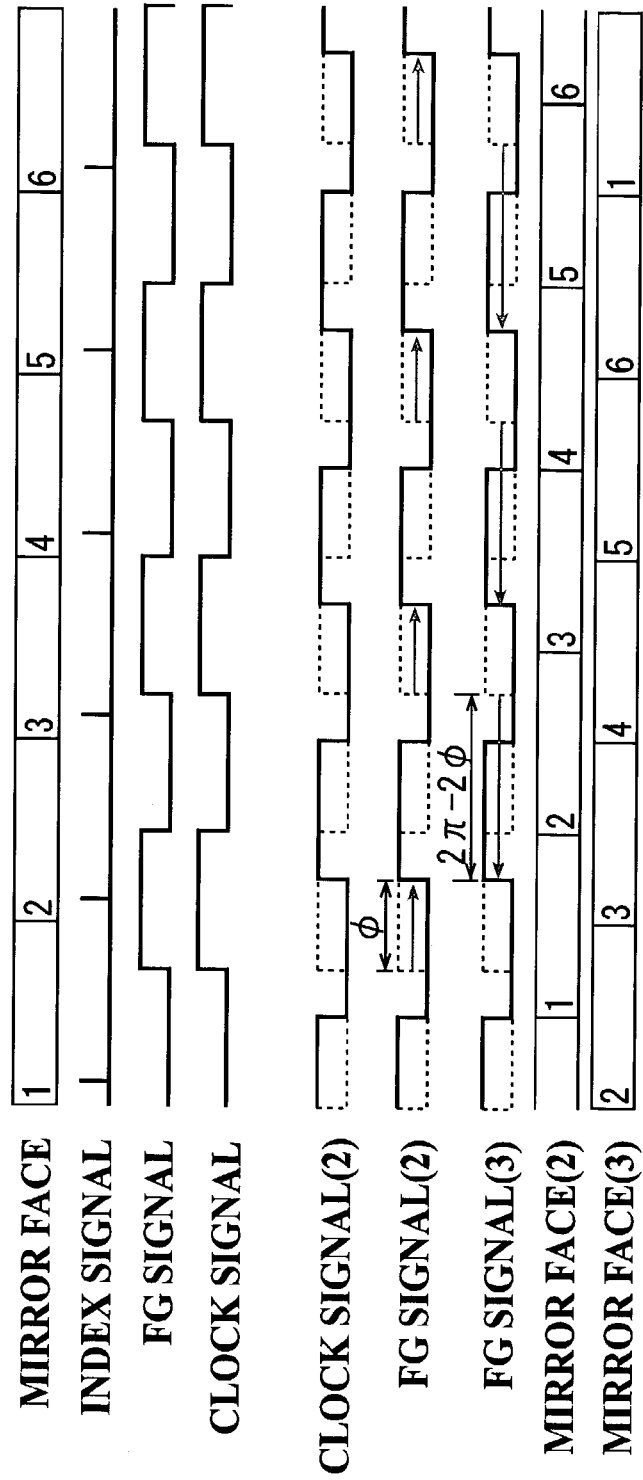
FIG.7A
FIG.7B

IMAGE FORMING APPARATUS AND SCANNING METHOD

BACKGROUND OF THE INVENTION

1. Field of the Invention

The present invention relates to an image forming apparatus and scanning method which are applied to a multicolor laser beam printer comprising a plurality of scanners, or the like.

2. Description of Related Art

In earlier technology, various image forming apparatuses for forming an image on an imaging material by modulating a plurality of light beams (laser beams) on the basis of image data, main-scanning the modulated light beams on the imaging material by using a polygon mirror (rotary polygonal mirror), and sub-scanning by rotating the imaging material have been known. Since such image forming apparatuses output a plurality of light beams, they comprise a plurality of scanners. However, registration deviation among each color in each scanner caused by deviation of a write timing signal of sub-scanning caused by phase shift of a polygon mirror driving motor provided in each scanner becomes a problem. In order to obtain multicolor printing of high accuracy by resolving this registration deviation, it is required to correct the registration deviation in sub-scanning direction in an accuracy of not more than one pixel.

Then, as a technique for correcting this kind of registration deviation, in the Japanese Patent Laid-Open Publication No. 7-160084 (hereinafter, it is described as the "foregoing technology 1"), correction data of registration deviation of each scanner to an arbitrary scanner is stored, and the phase of a reference frequency signal of a polygon mirror driving motor is changed on the basis of the correction data. At the same time, the delay time of the count enable signal inputted into a counter section for generating a write timing signal in the sub-scanning direction is switched, and thereby, counting error of the write timing signal in the sub-scanning direction is prevented. Thus, a technique for correcting registration deviation of each scanner is disclosed in the foregoing technology 1.

Further, in the above-mentioned image forming apparatuses, there is a case of performing phase control of a polygon mirror driving motor by using an output signal (FG signal), which is outputted from each hall element corresponding to a rotor of the polygon mirror driving motor or magnetic poles (south pole and north pole) provided in the polygon mirror, as a phase comparison signal of the polygon mirror driving motor. In the above-mentioned foregoing technology 1, the pulse number Pn of the FG signal detected per one rotation of a polygon mirror is subject to being set not more than the number of faces m of the polygon mirror, and the FG signal is used as a phase comparison signal of the polygon mirror driving motor. Thus, a technique of performing phase control of each polygon mirror driving motor in each scanner operated independently is disclosed in the foregoing technology 1.

However, in the image forming apparatus disclosed in the foregoing technology 1, at the time of carrying out initial phase control after a power source is turned on, there is a case that the phase of faces of polygon mirrors cannot be controlled precisely only by fulfilling the above-mentioned relationship of Pn≦m. Further, even though the correction data of registration deviation is stored, for example, in case of performing phase control by restarting the polygon mirror driving motor after rotation of the polygon mirror driving motor in each scanner is stopped temporarily because of jam or the like, also there is a problem that registration deviation cannot be corrected on the basis of the correction data since shift in the phase of faces of the polygon mirror is caused.

The problems in phase control in case of fulfilling the above-described relational expression will be explained as follows. For example, the cases such that the pulse numbers (FG signal) per one rotation are 6 (Pn=6) and 4 (Pn=4) when a polygon mirror has 6 faces (m=6) will be explained as an example. FIG. 7A is a view showing a timing diagram of an index signal (timing signal), FG signal, and clock signal that are outputted during one rotation of a polygon mirror when the polygon mirror fulfills the relationship between Pn=6 and m=6 (Pn≦m), and FIG. 7B is a view showing the same when the polygon mirror fulfills the relationship between Pn=4 and m=6 (Pn≦m).

As shown in FIG. 7A, since the polygon mirror has 6 faces, the reference numbers 1 to 6 in the figure correspond to the number of faces. The index signal is a signal for indicating read timing in one line in the main scanning direction, and corresponds with the number of faces of the polygon mirror by one to one. Further, the FG signal is operated in synchronization with the clock signal which is a reference frequency signal. In this case, when the phase of the clock signal is shifted, the rotation phase of the mirror faces also shifts for that much. Thereby, it can be found that precise phase control of the faces can be carried out. Further, even at the time of restarting, phase control can be realized at the same value on the basis of the previous correction data.

Next, FIG. 7B shows the case that phase control cannot be performed even though the above-described relational expression is fulfilled. The lower stage in FIG. 7B is a view showing a timing diagram in case of shifting the phase of the click signal for φ at the time of initial phase control. As shown in FIG. 7B, when the clock signal is shifted for φ, the phase difference of the following FG signal may become in two ways of φ or 2π−φ. As a result, there exists two kinds of cases, one being the case that the phase difference of the FG signal is φ and the other being the case that the phase difference is 2π−φ, so that there exist two kinds of angles of mirror faces as a result. Therefore, it is impossible to perform the aimed control precisely. That is, it is impossible to perform precise phase control even though the above-described relational expression is fulfilled. Further, in case of restarting the polygon mirror which is made to stop temporarily, since two kinds of angles of mirror faces exists, there is a problem such that aimed phase control of mirror faces cannot be performed.

Moreover, in the image forming apparatuses in the earlier technology, the faces utilized widely in polygon mirrors is 6 faces, and the magnetic poles of the polygon mirrors in this case may be generally 4 poles, 8 poles or 12 poles. When comparing the efficiency of the polygon mirror driving motors with 4 poles, 8 poles and 12 poles, it has a property such that the smaller the number of poles is, the worse the efficiency of torque generation is, and the larger the number of pole is, the larger the switching loss is. Here, deterioration of the efficiency causes rise of driving current value, in particular, when high-speed rotation is required, it accompanies temperature rise of the polygon mirror driving motor. Therefore, a problem is caused in stable control of the polygon mirror. Accordingly, in case of using 6 faces and 8 poles as an ideal relationship between the number of faces and the number of poles of a polygon mirror, there is a problem such that a polygon mirror having 6 faces and 8 poles cannot be used since precise control of phase of faces cannot be performed according to the above-mentioned reasons.

SUMMARY OF THE INVENTION

An object of the present invention is to provide an image forming apparatus and scanning method capable of controlling precisely the phase of a face of a rotary polygonal mirror, such as polygon mirror or the like, in each scanner and correcting registration deviation in the sub-scanning direction in an accuracy of not more than one pixel when carrying out phase control at the time of initial starting, and similarly, capable of controlling precisely the phase of the face of the rotary polygonal mirror even though in case of making the rotation of the rotary polygonal mirror stop temporarily.

In order to achieve the above-described object, according to an aspect of the present invention, the image forming apparatus of the present invention comprises: a plurality of scanners, each of the scanners having a rotary polygonal mirror; a position detecting section for generating an image start reference signal (write timing signal) in a main scanning direction to determine an image start position; a PLL control section for controlling a rotation number of the mirror on a basis of a reference frequency signal of the mirror and a pulse signal generated per one rotation of the mirror; and a phase control section for detecting phase difference of each mirror on the basis of the image start reference signal in the main scanning direction in the plurality of the scanners, controlling a phase of the reference frequency signal of each mirror, and correcting image deviation in a sub-scanning direction of an image formed by the plurality of the scanners, wherein a control angle in which one rotation angle of the mirror is divided by a number of the pulse signal generated per one rotation of the mirror is equal to an integral multiple of a division angle in which one rotation angle of the mirror is divided by a number of mirror faces of the mirror.

According to the image forming apparatus of the present invention, in the image forming apparatus comprising a plurality of scanners, a predetermined relationship between the control angle and the division angle of the rotary polygonal mirror in each independently operated scanner is fulfilled. Thereby, for example, when the rotation of the rotary polygonal mirror is made to stop after initial phase control is performed, and in case of restarting the rotary polygonal mirror, the image deviation in the sub-scanning direction can be corrected in an accuracy of not more than one pixel by controlling precisely the phase of faces in a plurality of rotary polygonal mirrors.

Preferably, the image forming apparatus of the present invention, further comprises: a dividing section for dividing the pulse signal generated per one rotation of the mirror and outputting a division signal to the PLL control section, wherein the dividing section divide the pulse signal by a division ratio in accordance with a value of the control angle so that the control angle becomes equal to the integral multiple of the division angle.

Therefore, since the number of pulse signals generated per one rotation of the rotary polygonal mirror, the pulse signals being inputted in the PLL control section, can be adjusted by providing the dividing section in the scanners, a predetermined relationship between the control angle and the division angle of the rotary polygonal mirror can be fulfilled, and the phase of faces of the rotary polygonal mirrors can be controlled easily. Thereby, a rotary polygonal mirror having various numbers of faces and numbers of magnetic poles is applicable, so that it is possible to control the rotary polygonal mirror stably.

Further, in case of making the mirror stop temporarily after turning on a power source of the apparatus and performing initial phase control, and making the temporarily stopped mirror drive again, the phase control section may perform phase control of the mirror again in accordance with a phase of the division signal.

Accordingly, it is possible to control precisely the phase difference of faces of the rotary polygonal mirrors on the basis of difference of phases of two kinds of division signals generated when using the dividing section, and to correct the image deviation in the sub-scanning direction in an accuracy of not more than one pixel.

Further, in case of calculating a correction amount of the image deviation in the sub-scanning direction corrected in initial phase control which is performed when a power source of the apparatus is turned on, and making the mirror, which is stopped temporarily, drive again, the phase control section may perform phase control of the mirror on the basis of the correction amount.

Therefore, since the phase control section can correct the phase difference in a plurality of rotary polygonal mirrors on the basis of the correction amount stored at the time of initial phase control when making the temporarily stopped rotary polygonal mirror drive again, trouble and time for phase control can be reduced, and laborsaving of the image forming apparatus and improvement of processing speed can be attempted.

Moreover, the image forming apparatus may further comprise: a control section for executing initial phase control when a power source of the apparatus is turned on, an forbidding to stop a drive of the mirror and forbidding the phase control section to perform phase control until the power source of the apparatus is turned off.

Therefore, since phase shift of the rotary polygonal mirrors in a plurality of scanners is not caused by making the rotation of the rotary polygonal mirrors not to stop, trouble and time for phase control can be reduced, and the rotary polygonal mirror can be constantly made to drive stably.

Further, the reference frequency signal may generated from a reference frequency signal generating section provided in the phase control section, and the phase control section may detect a position of a face of each rotating mirror according to the image start reference signal and may synchronize the position in the main scanning direction.

Further, preferably, the image forming apparatus further comprise: a control section for generally controlling the apparatus; and a driving member for rotating each mirror, wherein the PLL control section performs PLL control on the basis of the pulse signal and the reference frequency signal, makes the driving member drive so as to rotate each mirror at a constant speed when a rotation signal is outputted from the control section, and makes the driving member stop when a stop signal is outputted from the control section.

Moreover, a rotary member which rotates with each mirror may be provided to each mirror, and a plurality of magnetic poles for forming a magnetic field may be provided on a portion of the rotary member. In this case, the image forming apparatus may comprise: a detecting section for detecting a change of magnetic field strength generated by rotating each mirror and the rotary member, and the pulse signal in accordance with the change of the magnetic field strength may be outputted from the detecting section to the PLL control section.

Further, the rotary polygonal mirror is preferable to be a polygon mirror, and the detecting section is preferable to be a hall element. Moreover, four of the scanners may be provided in the apparatus, and the scanners may be divided into each color of magenta, cyan, yellow and black.

Further, according to another aspect of the present invention, the scanning method of the present invention is a scanning method for forming an image by using a plurality of scanners, each of the scanners having a rotary polygonal mirror, comprising: generating an image start reference signal in a main scanning direction; controlling a rotation number of the mirror on a basis of a reference frequency signal of the mirror and a pulse signal generated per one rotation of the mirror; and correcting image deviation in a sub-scanning direction of the image formed by the plurality of the scanners by detecting phase difference of each mirror on the basis of the image start reference signal in the main scanning direction in the plurality of the scanners, and by controlling a phase of the reference frequency signal of each mirror, wherein a control angle in which one rotation angle of the rotary polygonal mirror is divided by a number of the pulse signal generated per one rotation of the rotary polygonal mirror is equal to an integral multiple of a division angle in which one rotation angle of the rotary polygonal mirror is divided by a number of mirror faces of the rotary polygonal mirror.

BRIEF DESCRIPTION OF THE DRAWINGS

The present invention will become more fully understood from the detailed description given hereinbelow and the appended drawings which given by way of illustration only, and thus are not intended as a definition of the limits of the present invention, and wherein;

FIG. 3 is a block diagram showing detail sections of a driving control circuit block provided in the scanner shown in FIG. 2A;

FIGS. 4A to 4C are timing diagrams showing operation of driving control circuit block shown in FIG. 3;

FIGS. 6A to 6C are timing diagrams showing an operation of the synchronous control circuit shown in FIG. 5; and FIGS. 7A and 7B are timing diagrams showing phase control of a polygon mirror having 6 faces and 8 poles according to a synchronous control circuit in earlier technology.

PREFERRED EMBODIMENT OF THE INVENTION

Figure 1:
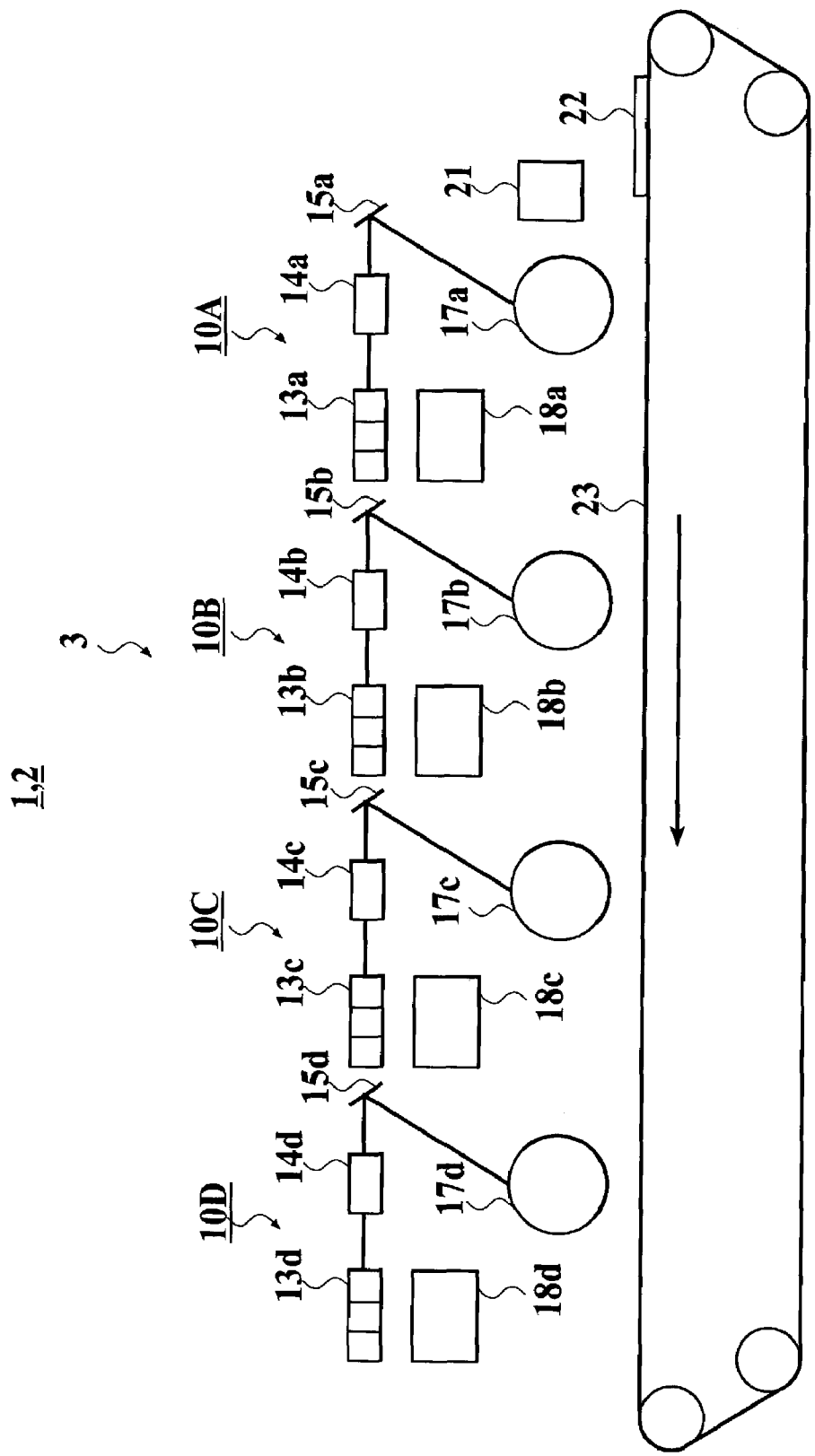
FIG. 1 is a view schematically showing an image forming section in an image forming apparatus of an embodiment to which the present invention is applied.

Hereinafter, embodiments of the present invention will be explained in detail with reference to the drawings. However, the range of the invention is not limited to the embodiments. Here, the correspondence between each component of an image forming apparatus according to the present invention and that of image forming apparatuses 1 and 2 in the embodiments will be explained. That is, the position detecting section in the image forming apparatus of the present invention corresponds to each index sensor 16 in the image forming apparatuses 1 and 2 in the embodiments, and the PLL control section of the present invention corresponds to each motor driving circuit 102 in the embodiments. Further, the phase control section of the present invention corresponds to each phase control circuit 101 in the embodiments, and the control section of the present invention corresponds to each control circuit 110 in the embodiments. Moreover, the rotary polygonal mirror of the present invention corresponds to each polygon mirror 13 in the embodiments, the image start reference signal of the present invention corresponds to the index signal in the embodiments, the reference frequency signal of the present invention corresponds to the clock signal in the embodiments, the pulse signal of the present invention corresponds to the FG signal in the embodiments, and the dividing section of the present invention corresponds to each dividing circuit 104 in the embodiments. Furthermore, the reference frequency signal generating section of the present invention corresponds to the clock generation circuit in the embodiments, the driving member of the present invention corresponds to the polygon mirror driving motor 18 in the embodiments, the rotary member of the present invention corresponds to the rotor in the embodiments, and the detection member of the present invention corresponds to each hall element 103 in the embodiments.

First Embodiment

At first, the structure will be explained.

Figure 2A:
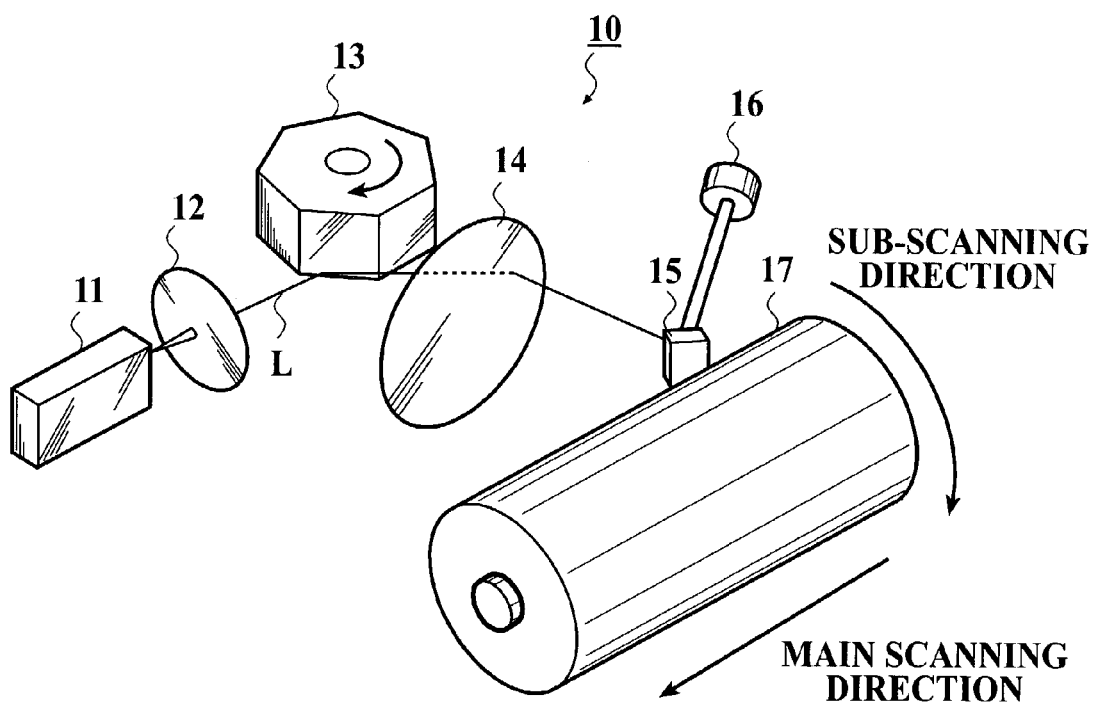
FIG. 2A is a perspective view showing a scanner provided in the image forming section shown in FIG. 1.

FIG. 1 is a view schematically showing an image forming section 3 comprising four sets of scanners 10A to 10D in an image forming apparatus 1 in a first embodiment. FIG. 2A is a perspective view showing a scanner 10.

As shown in FIG. 1, the image forming section 3 comprises four sets of scanners 10A to 10D in order to form a color image in which four colors of image are overlapped. The four sets of scanners 10A to 10D are divided into each color of magenta, cyan, yellow and black, and are installed along a belt 23 at predetermined space. Each scanner 10A to 10D develops a latent image formed on an image carrier 17a to 17d by each developing unit, transfers the developed toner image to a paper 22 conveyed by the belt 23, and finally a color image in which four colors of image are overlapped is formed on the paper 22 by transferring all of the four colors.

Next, about the scanners 10A to 10D will be explained with reference to FIG. 2A. Here, in the first embodiment, the image forming section 3 comprises four sets of scanners 10A to 10D. However, since the scanners 10A to 10D have similar structure and operation, for convenience of explanation hereafter, the scanners 10A to 10D are generally shown as a scanner 10, and the structure and the control thereof will be explained.

The scanner 10 oscillates a semiconductor laser 11 by an image signal modulated in accordance with image data to emit a laser beam L. The laser beam L is deflected by a polygon mirror 13 rotating at a predetermined speed, and the laser beam L is converged by an fθ lens 14 and the like to spots corresponding to 600 dpi on an image carrier 17 and scanned to form a latent image. The scanner 10 comprises a semiconductor laser 11, collimator lens 12, polygon mirror 13, fθ lens 14, reflecting mirror 15 and index sensor 16. In addition, in the embodiment, the direction for scanning the laser beam L is the main scanning direction, and the direction for moving the image carrier 17 is the sub-scanning direction.

The semiconductor laser 11 comprises a semiconductor luminescent section 111 (not shown). As a material of the semiconductor of the semiconductor luminescent section 111, a GaAlAs or the like is used.

The collimator lens 12 converges a divergent light emitted from the semiconductor laser 11 to represent parallel light fluxes, and directs the fluxes to the polygon mirror 13.

The polygon mirror 13 deflects the laser beam L entered from the collimator lens 12 and directs it to the fθ lens 14. Here, in the first embodiment, as for controlling precisely the phase of faces of four sets of polygon mirrors 13 provided in four sets of scanners 10A to 10D, the number of faces and the number of magnetic poles of the polygon mirrors 13 fulfills the following relationship.

That is, the control angle (360°/Pn) in which one rotation angle (360°) of the polygon mirror 13 is divided by a pulse number Pn per one rotation is equal to integral multiple of the division angle (360°/m) in which one rotation angle (360°) of the polygon mirror 13 is divided by a number of mirror faces m. Concretely, when the polygon mirror 13 has 6 faces (m=6), and if the magnetic poles are 4 poles, the pulse number of the FG signal becomes 2 (Pn=2), so that the relationship between the control angle and the division angle becomes as follows.

360/2=180 (control angle)

360/6=60 (division angle)

180=60×3

In this case, the control angle becomes the integral multiple (threefold) of the division angle, so that the above-mentioned relationship is fulfilled. Therefore, precise phase control can be performed.

Further, when the polygon mirror 13 has 6 faces (m=6) and the magnetic poles are 8 poles, the pulse number of the FG signal becomes 4 (Pn=4), so that the relationship between the control angle and the division angle becomes as follows.

360/4=90 (control angle)

360/6=60 (division angle)

90=60×1.5

Accordingly, when the polygon mirror 13 has 6 faces and the magnetic poles are 8 poles, since the above-mentioned relationship is not fulfilled, precise phase control cannot be performed.

In addition, the relationship between the number of faces and the number of magnetic poles of the polygon mirror is the same even though the number of faces of the polygon mirror changes. Precise phase control of a face of a polygon mirror can be performed by fulfilling the relationship.

The fθ lens 14 converges the laser beam L, realizes scanning of scanning face at a constant speed, and corrects curvature of image and astigmatism. Behind the fθ lens 14, imaging optics for correcting the image focus location of the laser beam L (slant angle of the polygon mirror) is provided.

The reflecting mirror 15 is for guiding the laser beam L to the index sensor 16 when the laser beam L is emitted to the tip of the scanning line.

Figure 2B:
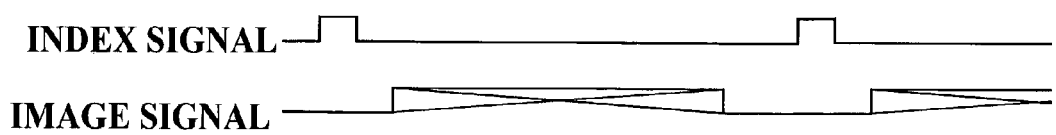
FIG. 2B is a timing diagram showing an output operation of an index signal outputted from an index sensor in the scanner shown in FIG. 2A and that of an image signal.

The index sensor 16 detects the laser beam L deflected by the polygon mirror 13, and emits an index signal for determining the start point of an image signal (c.f. FIG. 2B).

The image carrier 17 is driven to rotate by synchronizing with scanning of the laser beam L. Thereby, the laser beam L and the image carrier 17 move relatively to the sub-scanning direction to carry out image exposure corresponding to image data, and a two-dimensional electrostatic latent image is recorded on the image carrier 17.

Next, a driving control circuit block 100 of the polygon mirror driving motors 18a to 18d provided in the scanners 10A to 10D, respectively, will be explained with reference to FIG. 3. The phase control circuit 101 is for being operated in response to the phase control execution signal from the control circuit 110 which generally controls the image forming apparatus 1. In each scanner 10A to 10D, the polygon mirror 13 is rotated by a rotation/stop signal from the control circuit 110, and the position of a face of each of the four sets of polygon mirrors 13 rotating at a predetermined speed is detected by an index signal generated by entering the laser beam L into the index sensor 16 through the polygon mirror 13 to synchronize in the main scanning direction by the phase control circuit 101.

As shown in FIG. 3, the driving control circuit block 100 comprises a phase control circuit 101, four sets of index sensors 16a to 16d, motor driving circuits 102a to 102d, polygon mirror driving motors 18a to 18d, hall elements 103a to 103d and the like. Here, for convenience of explanation, the characters "a to d" will be omitted hereafter.

The phase control circuit 101 comprises a clock generation circuit (not shown) for generating clock signals which become reference frequency signals commonly used in four sets of motor driving circuits 102. The phase control circuit 101 generates clock signals on the basis of index signals for detecting the scanning start positions of laser beams, and outputs them to four sets of motor driving circuits 102. Further, when a phase control execution signal is outputted from the control circuit 110, the phase control circuit 101 calculates the correction amount of registration deviation (image deviation) detected among a plurality of polygon mirrors on the basis of the index signals inputted from the index sensors 16 at the time of initial phase control after the power source is turned on. Then, it corrects the registration deviation in a plurality of polygon mirrors 13 by controlling the phase of the clock signals on the basis of the correction amount.

When rotation signals are outputted from the control circuit 110, the motor driving circuits 102 perform PLL (Phase Lock Loop) control on the basis of the clock signals inputted from the phase control circuit 101 and the FG signals inputted from the hall elements 103, and drive the polygon mirror driving motors 18 so that the polygon mirrors 13 may rotate at a constant speed. Further, when stop signals are outputted from the control circuit 110, the motor driving circuits 102 stop the driving of the polygon mirror driving motors 18.

In addition, after the power source is turned on and initial phase control is carried out, PLL lock detection signals are outputted from the motor driving circuits 102 to the control circuit 110. The control circuit 110 forbids to stop a drive of the polygon mirrors 13 and makes the phase control circuit 101 not to perform phase control until the power source is turned off while monitoring the PLL lock detection signal.

The hall elements 103 are rotation position detecting sections of the polygon mirrors 13, and detect the magnetic field formed by the magnetic poles (south pole and north pole) as sections to be detected provided on a portion of rotors (not shown) rotating with the polygon mirrors 13. That is, by rotating the polygon mirrors 13 and rotors, and thereby, the magnetic field strength detected by the hall elements 103 changes, and FG signals corresponding to the change of the magnetic field strength are outputted from the hall elements 103 to the motor driving circuits 102. The FG signals are repeated pulse signals for making ON/OFF at a frequency corresponding to the rotation number of the polygon mirrors 13.

Next, the operation of controlling phase of faces of the polygon mirrors 13 having 6 faces and 4 poles by the driving control circuit block 100 comprising the above-described structure will be explained.

FIGS. 4A to 4C are timing diagrams showing phase control of each polygon mirror driving motor 18 according to the driving control circuit block 100. At first, FIG. 4A is a view showing a timing diagram in a state that initial phase control is performed after the power source is turned on. The reference numerals 1 to 6 denote the mirror faces of each polygon mirror 13. Further, the index signals detected by each index sensor 16 correspond to the mirror faces, and the FG signal (1) is operated by synthesizing with the clock signal (1).

FIG. 4B is a view showing a timing diagram of each polygon mirror driving motor 18. When the phase of the clock signal (1) of each polygon mirror driving motor 18 is shifted for φ, there is a possibility that the phase of the FG signal (1) may be shifted in two ways of φ or 2π−2φ. Here, the signal in which the phase of the clock signal (1) is shifted for φ is shown as a clock signal (2), the signal in which the phase of the FG signal (1) is shifted for φ is shown as an FG signal (2), and the signal in which the phase of the FG signal (1) is shifted for 2π−2φ is shown as an FG signal (3). Moreover, since the relationship between the FG signal and the mirror faces does not change, the mirror faces corresponding to the FG signal (2) are shown as a mirror face (2), and the mirror faces corresponding to the FG signal (3) are shown as a mirror face (3).

That is, as shown in FIG. 4B, when the phase of the clock signal (1) shifts for φ, the phase of the FG signal (1) shifts in two ways of φ and 2π−2φ. However, by fulfilling the before-mentioned relationship of the mirror faces and magnetic poles of the polygon mirrors 13, the phase of faces of the corresponding mirror face (2) and mirror face (3) does not shift. Therefore, since the phase of faces of four sets of polygon mirrors 13 does not shift, precise phase control can be carried out at the time of initial phase control by the phase control circuit 101, and by correcting the clock signal (1) on the basis of the correction amount of registration deviation among the stored four sets of polygon mirrors 13 (c.f. FIG. 4C), the scanning start position of the polygon mirrors 13 can be controlled precisely, and color deviation according to image deviation in the sub-scanning direction can be prevented.

Second Embodiment

Next, a second embodiment will be explained with reference to FIGS. 5 to 6C.

In addition, since the image forming apparatus 2 in the second embodiment has approximately similar structure as the image forming apparatus 1 in the first embodiment, the same reference numerals in the drawings are attached to the portions having the same structure as the above-mentioned first embodiment, and their explanation is omitted.

Figure 5:
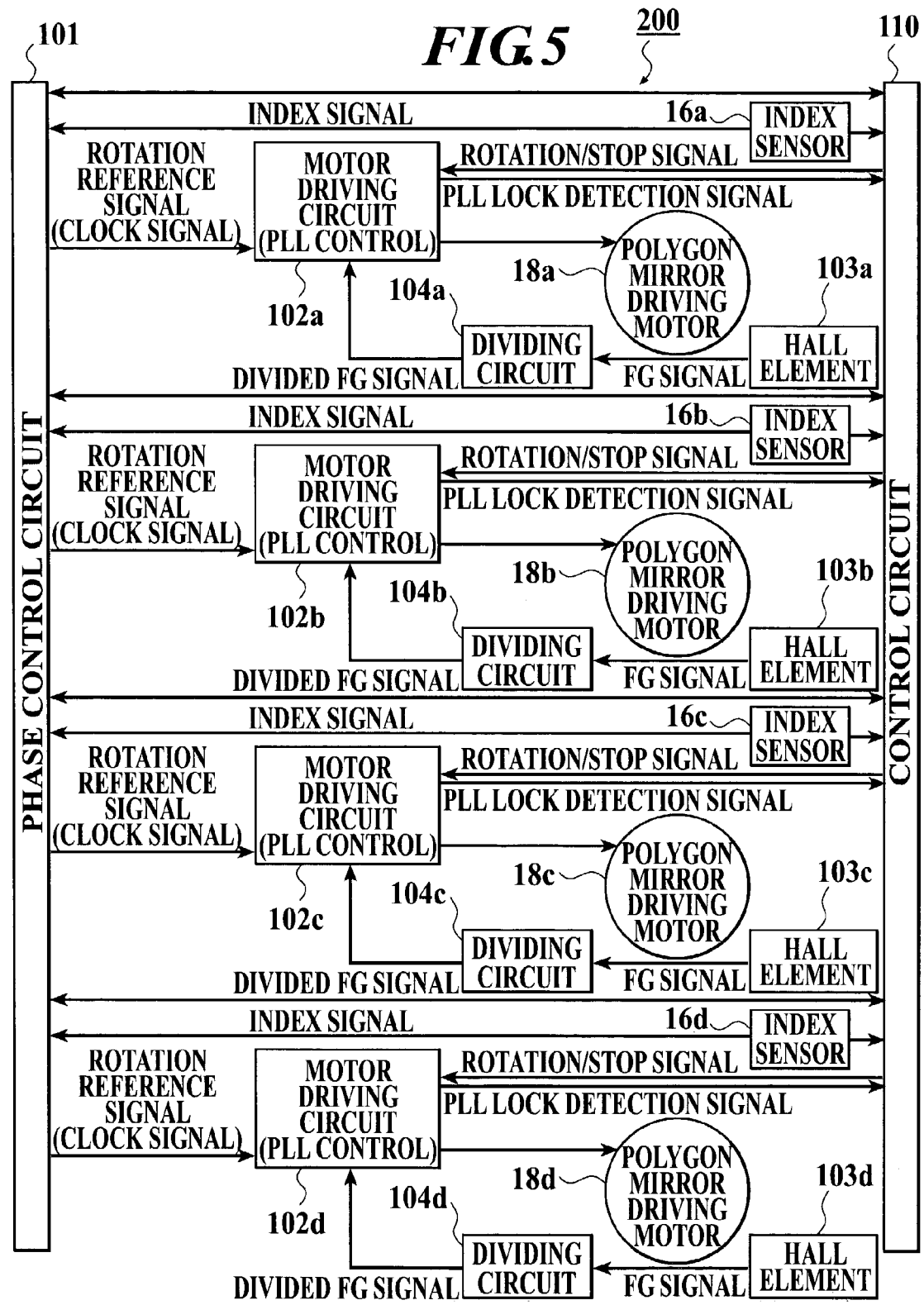
FIG. 5 is a block diagram showing detail sections of a synchronous control circuit in a second embodiment.

FIG. 5 is a block diagram showing the detail structure of a synchronization control circuit 200 in the second embodiment. As shown in FIG. 5, the synchronization control circuit 200 has a structure such that the above-mentioned driving control circuit block 100 further comprises dividing circuits 104a to 104d (hereafter, "a to d" are omitted), which is a characteristic structure of the second embodiment.

The dividing circuits 104 divide the FG signals outputted from the hall elements 103 by an arbitrary division ratio (n), and output the divided FG signals to the motor driving circuits 102. That is, since the pulse number of the FG signals outputted from the hall elements 103 can be made to be 1/n by providing the dividing circuits 104, the above-mentioned relationship between the number of faces and the number of magnetic poles of the polygon mirrors 13 can be adjusted. Therefore, it is possible to perform phase control by utilizing polygon mirrors 13 having various faces and magnetic poles.

For example, in case of using polygon mirrors 13 having 6 faces and 8 poles, it is impossible to perform phase control since the relationship between the control angle and the division angle does not become integral multiple, as mentioned above. However, the dividing circuits 104 divide the FG signals outputted from the hall elements 103 by twofold, and thereby, the pulse number Pn=4 can be made into ½ to become Pn=2. Therefore, the relationship between the control angle and the division angle becomes as follows.

360/2=180 (control angle)

360/6=60 (division angle)

180=60×3

Accordingly, the control angle becomes integral multiple (threefold) of the division angle, so that the above-mentioned relationship is fulfilled. Therefore, it becomes possible to perform phase control of the polygon mirrors 13 having 6 faces and 8 poles according to the synchronization control circuit 200.

Phase control of faces of the polygon mirrors 13 having 6 faces and 8 poles according to the synchronization control circuit 200 will be explained with reference to FIGS. 6A to 6C.

FIG. 6A is a view showing a timing diagram in a state that initial phase control is performed after the power source is turned on. The reference numerals 1 to 6 in the figure denote the mirror faces of the polygon mirrors 13, and the index signals detected by each index sensor 16 correspond to the mirror faces. Further, the FG signal outputted from each hall element 103 is divided by each dividing circuit 104, and the divided FG signal (1) is operated by synchronizing with the clock signal (1). Further, when the FG signal is divided by each dividing circuit 104, there is a case such that it is divided by shifting for 180° from the FG signal (1). In this case, the divided FG signal (2), which is shifted for 180°, is operated by synchronizing with the clock signal (2).

That is, when the FG signal is divided by each dividing circuit 104, there is a case that it may become into two kinds of divided FG signals, which are the divided FG signal (1) and the divided FG signal (2). With respect to control of the polygon mirror driving motors 18, it is required to perform phase control on the basis of two kinds of divided FG signals. Hereinafter, phase control according to difference of phases of the divided FG signals (1) and (2) will be explained.

FIG. 6B is a timing diagram showing the relationship between the divided FG signals and mirror faces when the polygon mirror driving motors 18 are restarted after being made to stop temporarily and the clock signal (3) is inputted. As shown in FIG. 6B, the clock signal (3) shows the case that its phase is shifted for φ from the clock signal (1) at the time of initial starting. The divided FG signal (1) following the clock signal (3) shifts in two ways of φ or 2π−2φ. Here, when the signal in which the phase is shifted for φ from the divided FG signal is made to be the divided FG signal (1-1) and the signal in which the phase is shifted for 2π−2φ is made to be the divided FG signal (1-2), the mirror face corresponding to the divided FG signal (1-1) is shown as a mirror face (1-1), and the mirror face corresponding to the divided FG signal (1-2) is shown as a divided FG signal (1-2).

Therefore, when the FG signal is divided at the timing of the divided FG signal (1) in phase control at the time of initial starting, phase control of the divided FG signal (1) is performed on the basis of two kinds of shift amount ($\phi$ and $2\pi-2\phi$) by following the clock signal (3) in which the phase is shifted for $\phi$ according to phase control. However, since shift in the phases of the corresponding mirror face (1-1) and mirror face (1-2) is not caused, it is possible to perform precise phase control.

Further, FIG. 6C is a timing diagram showing a relationship between the divided FG signals and the mirror faces when the clock signal (3) is inputted into each polygon mirror driving motor 18. That is, the clock signal (3) shows the case that the phase is shifted for $\pi+\phi$ from the clock signal (2) at the time of initial starting. The divided FG signal (2) following the clock signal (3) shifts in two ways of $\pi-\phi$ or $\pi+\phi$. Here, when the signal in which the phase is shifted for $\pi-\phi$ from the divided FG signal (2) is made to be the divided FG signal (2-1) and the signal in which the phase is shifted for $\pi+\phi$ is made to be the divided FG signal (2-2), the mirror faces corresponding to the divided FG signal (2-1) are shown as a mirror face (2-1), and the mirror faces corresponding to the divided FG signal (2-2) are shown as a mirror face (2-2).

Accordingly, when the FG signal is divided at the timing of the divided FG signal (2) at the time of initial starting, phase control of the divided FG signal (2) is performed on the basis of two kinds of shift amount ($\pi-\phi$ and $\pi+\phi$) by following the clock signal (3) in which the phase is shifted for $\pi+\phi$ according to phase control. However, since shift in the phases of the corresponding mirror face (2-1) and mirror face (2-2) is not caused, it is possible to perform precise phase control.

As mentioned above, when the FG signal is divided by each dividing circuit 104, there is a possibility that two kinds of divided FG signals whose phases are different for 180° are generated. Therefore, when the polygon mirror driving motors 18 are restarted, the previous correction amount cannot be used, and it is required to carry out phase control again. Thereby, registration deviation in the sub-scanning direction can be corrected in an accuracy not more than one pixel.

As described above, according to the first and second embodiments, in case of correcting registration deviation of sub-scanning caused by phase shift of the polygon mirror driving motor 18 provided in each scanner 10 of the image forming apparatus 1 in an accuracy not more than one pixel, the phase of a face of the applicable polygon mirror 13 after being restarted can be controlled by arranging the number of faces and the number of magnetic poles of the polygon mirror 13 so as to fulfill the relationship such that the control angle becomes integral multiple of the division angle. Thereby, registration deviation in the sub-scanning direction can be corrected on the basis of the correction amount calculated at the time of initial phase control.

Further, in case of providing each scanner 10 by utilizing a polygon mirror 13 which does not fulfill the above-mentioned relationship between the control angle and the division angle, the above-described relationship between the control angle and the division angle can be fulfilled by using the dividing circuits 104. In this case, since there may exist two kinds of divided FG signals, phase control is carried out again when each polygon mirror driving motor 18 is restarted, so that shift in the phase of a face can be corrected.

Accordingly, even though it is a polygon mirror which does not fulfill the above-mentioned relationship between the control angle and the division angle, it is possible to control precisely the phase of mirror faces by utilizing the dividing circuits 104. Therefore, the image forming apparatus 2 can be provided by applying the polygon mirrors having various faces and magnetic poles. Thereby, control of the polygon mirrors 13 can be performed stably without deteriorating the torque efficiency or lowering the switching loss at the time of driving the polygon mirrors 13.

In addition, since the relationship between the FG signal and the mirror faces is kept constant while rotation of the polygon mirror driving motors continues, the polygon mirror driving motors are made not to stop rotating until the main power source is turned off after the power source is turned on. Thereby, the time for phase control when coming back to steady rotation at the time of restarting and low-power-consumption mode or the like can be reduced. Further, it is possible to realize constantly stable phase control of a polygon mirror and to correct precisely registration deviation in the sub-scanning direction to not more than one pixel.

In addition, the above description in the embodiments are preferred examples of the image forming apparatuses 1 and 2 according to the present invention, so that the present invention is not limited to these.

For example, the case that the polygon mirror has 6 faces is explained as an example, the present invention is not limited to this. The number of faces and the number of magnetic poles are arbitrary as far as it is a polygon mirror which fulfills the above-mentioned relationship between the number of faces and the number of magnetic poles. Further, the dividing circuits 104 divide the FG signal by a division ratio of twofold. However, the division ratio of the dividing circuits 104 is not limited to this. Each dividing circuit may divide the FG signal by a suitable division ratio when the utilized polygon mirror fulfills the above-mentioned relationship between the control angle and the division angle.

Alternatively, although the image forming section 3 comprises four sets of scanners 10A to 10D, the number of scanners 10 provided in the image forming apparatus 3 is arbitrary. Moreover, detail structure and detail operation of the image forming apparatuses 1 and 2 in the embodiments can be modified in a range within the scope of the present invention.

As mentioned above, according to the present invention, in case of correcting registration deviation of sub-scanning caused by phase shift of the polygon mirror driving motor 18 provided in each scanner 10 of the image forming apparatuses 1 and 2 in an accuracy not more than one pixel, phase control is carried out precisely and the phase of a face of the applicable polygon mirror 13 after being restarted can be controlled by arranging the number of faces and the number of magnetic poles of the polygon mirror 13 so as to fulfill the relationship such that the control angle becomes integral multiple of the division angle. Thereby, registration deviation in the sub-scanning direction is corrected on the basis of the correction amount stored at the time of initial phase control.

The entire disclosure of Japanese Patent Application No. 2002-126202 filed on Apr. 26, 2002 including specification, claims, drawings and summary are incorporated herein by reference in its entirety.

What is claimed is:

1. An image forming apparatus comprising:
a plurality of scanners, each of the scanners having a rotary polygonal mirror;
a position detecting section for generating an image start reference signal in a main scanning direction;
a PLL control section for controlling a rotation number of the mirror on a basis of a reference frequency signal of the mirror and a pulse signal generated per one rotation of the mirror; and
a phase control section for detecting phase difference of each mirror on the basis of the image start reference signal in the main scanning direction in the plurality of the scanners, controlling a phase of the reference frequency signal of each mirror, and correcting image deviation in a sub-scanning direction of an image formed by the plurality of the scanners,
wherein a control angle in which one rotation angle of the mirror is divided by a number of the pulse signal generated per one rotation of the mirror is equal to an integral multiple of a division angle in which one rotation angle of the mirror is divided by a number of mirror faces of the mirror.

2. The apparatus of claim 1, further comprising:
a dividing section for dividing the pulse signal generated per one rotation of the mirror and outputting a division signal to the PLL control section,
wherein the dividing section divide the pulse signal by a division ratio in accordance with a value of the control angle so that the control angle becomes equal to the integral multiple of the division angle.

3. The apparatus of claim 2, wherein in case of making the mirror stop temporarily after turning on a power source of the apparatus and performing initial phase control, and making the temporarily stopped mirror drive again, the phase control section performs phase control of the mirror again in accordance with a phase of the division signal.

4. The apparatus of claim 1, wherein in case of calculating a correction amount of the image deviation in the sub-scanning direction corrected in initial phase control which is performed when a power source of the apparatus is turned on, and making the mirror, which is stopped temporarily, drive again, the phase control section performs phase control of the mirror on the basis of the correction amount.

5. The apparatus of claim 1, further comprising: a control section for executing initial phase control when a power source of the apparatus is turned on, an forbidding to stop a drive of the mirror and forbidding the phase control section to perform phase control until the power source of the apparatus is turned off.

6. The apparatus of claim 1, wherein the reference frequency signal is generated from a reference frequency signal generating section provided in the phase control section, and the phase control section detects a position of a face of each rotating mirror according to the image start reference signal and synchronizes the position in the main scanning direction.

7. The apparatus of claim 1, further comprising:
a control section for generally controlling the apparatus; and a driving member for rotating each mirror,
wherein the PLL control section performs PLL control on the basis of the pulse signal and the reference frequency signal, makes the driving member drive so as to rotate each mirror at a constant speed when a rotation signal is outputted from the control section, and makes the driving member stop when a stop signal is outputted from the control section.

8. The apparatus of claim 1, wherein a rotary member which rotates with each mirror is provided to each mirror, and a plurality of magnetic poles for forming a magnetic field are provided on a portion of the rotary member,
the apparatus comprising: a detecting section for detecting a change of magnetic field strength generated by rotating each mirror and the rotary member, and
the pulse signal in accordance with the change of the magnetic field strength is outputted from the detecting section to the PLL control section.

9. The apparatus of claim 8, wherein the rotary polygonal mirror is a polygon mirror, and the detecting section is a hall element.

10. The apparatus of claim 1, wherein four of the scanners are provided in the apparatus, and the scanners are divided into each color of magenta, cyan, yellow and black.

11. A scanning method for forming an image by using a plurality of scanners, each of the scanners having a rotary polygonal mirror, comprising:
generating an image start reference signal in a main scanning direction;
controlling a rotation number of the mirror on a basis of a reference frequency signal of the mirror and a pulse signal generated per one rotation of the mirror; and
correcting image deviation in a sub-scanning direction of the image formed by the plurality of the scanners by detecting phase difference of each mirror on the basis of the image start reference signal in the main scanning direction in the plurality of the scanners, and by controlling a phase of the reference frequency signal of each mirror,
wherein a control angle in which one rotation angle of the rotary polygonal mirror is divided by a number of the pulse signal generated per one rotation of the rotary polygonal mirror is equal to an integral multiple of a division angle in which one rotation angle of the rotary polygonal mirror is divided by a number of mirror faces of the rotary polygonal mirror.

12. The method of claim 11, further comprising:
dividing the pulse signal generated per one rotation of the mirror, and outputting a division signal in the controlling the rotation number of the mirror;
wherein the pulse signal is divided by a division ratio in accordance with a value of the control angle so that the control angle becomes equal to the integral multiple of the division angle in the outputting the division signal.

13. The method of claim 12, wherein in case of making the mirror stop temporarily after turning on a power source of an apparatus for driving the scanners and performing initial phase control, and making the temporarily stopped mirror drive again, phase control of the mirror is performed again in accordance with a phase of the division signal, in the correcting.

14. The method of claim 11, wherein in case of calculating a correction amount of the image deviation in the sub-scanning direction corrected in initial phase control which is performed when a power source of an apparatus for driving the scanners is turned on and making the mirror, which is stopped temporarily, drive again, phase control of the mirror is performed on the basis of the correction amount in the correcting.

15. The method of claim 11, further comprising:
executing initial phase control when a power source of an apparatus for driving the scanners is turned on, and forbidding to stop a drive of the mirror and forbidding phase control in the correcting until the power source of the apparatus is turned off.

16. The method of claim 11, wherein a position of a face of the rotating mirror is detected according to the image start reference signal, and the position is synthesized in the main scanning direction, in the correcting.

17. The method of claim 11, wherein each mirror is connected to a driving member for rotating each mirror on the basis of a rotation signal or a stop signal, and in the controlling the rotation number of the mirror, PLL control is performed on the basis of the pulse signal and the reference frequency signal, the driving member is made to drive so as to rotate each mirror at a constant speed when the rotation signal is outputted, and the driving member is made to stop when the stop signal is outputted.

18. The method of claim 11, wherein a rotary member which rotates with each mirror is provided to each mirror, and a plurality of magnetic poles for forming a magnetic field are provided on a portion of the rotary member, the method comprising: detecting a change of magnetic field strength generated by rotating each mirror and the rotary member, and the pulse signal in accordance with the change of the magnetic field strength is outputted in the controlling the rotation number of the mirror.

19. The method of claim 18, wherein the rotary polygonal mirror is a polygon mirror, and the detecting section is a hall element.

20. The method of claim 11, wherein four of the scanners are provided, and the scanners are divided into each color of magenta, cyan, yellow and black.

* * * * *